United States Patent
Farnsworth et al.

[15] 3,662,368
[45] May 9, 1972

[54] TELEMETERING SYSTEM HAVING A CONTINUOUSLY MONITORING ENCODER

[72] Inventors: Richard G. Farnsworth, York, Maine; James H. Keller, Jr., Rowley, Mass.

[73] Assignee: General Electric Company

[22] Filed: Jan. 9, 1970

[21] Appl. No.: 1,609

[52] U.S. Cl..............................340/204, 340/190, 340/151, 250/219 DD, 179/2 DP
[51] Int. Cl......................................................G08c 19/16
[58] Field of Search...........340/204, 183, 188, 151, 173 LM, 340/190; 250/219 D, 231 SE, 219 DD; 346/14 MR; 179/2 DP; 335/207

[56] References Cited

UNITED STATES PATENTS

| 3,083,357 | 4/1963 | Chapin et al. | 340/204 |
| 3,491,244 | 1/1970 | Stewart, Jr. | 340/204 |
| 3,047,662 | 7/1962 | Smith | 340/204 |
| 2,537,005 | 10/1970 | Adair | 340/188 |
| 2,866,183 | 12/1958 | Awot et al. | 340/204 |
| 3,408,634 | 10/1968 | Lee et al. | 340/173 LM |
| 3,435,313 | 3/1969 | Siefert et al. | 318/138 |
| 3,266,018 | 8/1966 | Higgins | 340/204 |
| 3,519,994 | 8/1970 | Morton | 340/204 |

Primary Examiner—John W. Caldwell
Assistant Examiner—Robert J. Mooney
Attorney—Francis X. Doyle, Vale P. Myles, Frank L. Neuhauser, Oscar B. Waddell and Joseph B. Forman

[57] ABSTRACT

Apparatus for continuously monitoring a meter in a telemetering system and for encoding the information thus derived to adapt it for transmission in machine readable form to a location remote from the meter. The apparatus is characterized by incorporating transducer means that serve to transmit a code from the monitored meter to a telecommunications system through a non-mechanical connecting link.

9 Claims, 7 Drawing Figures

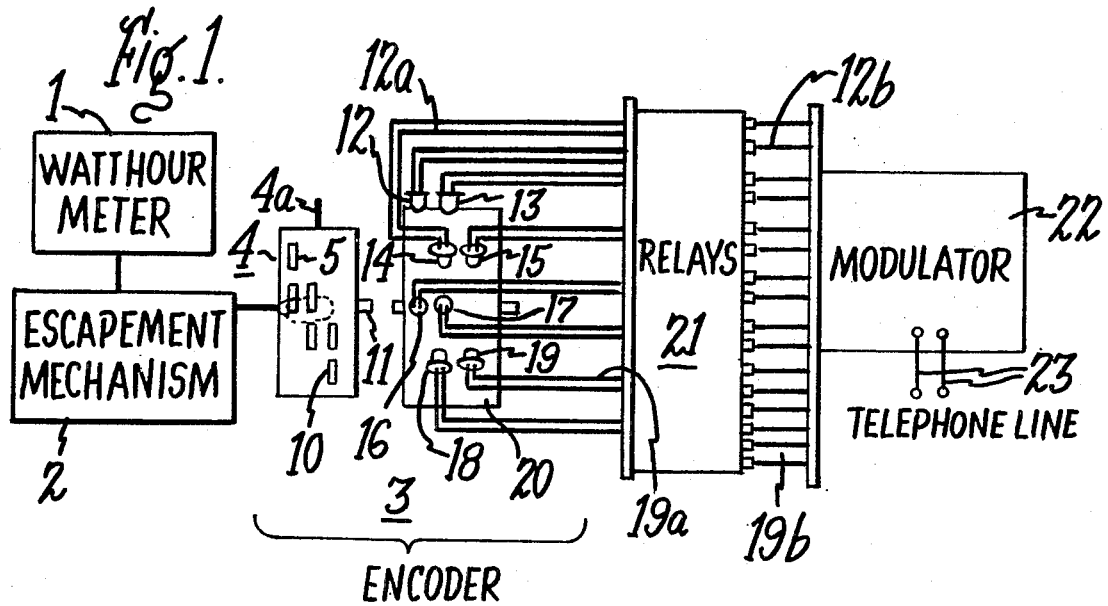
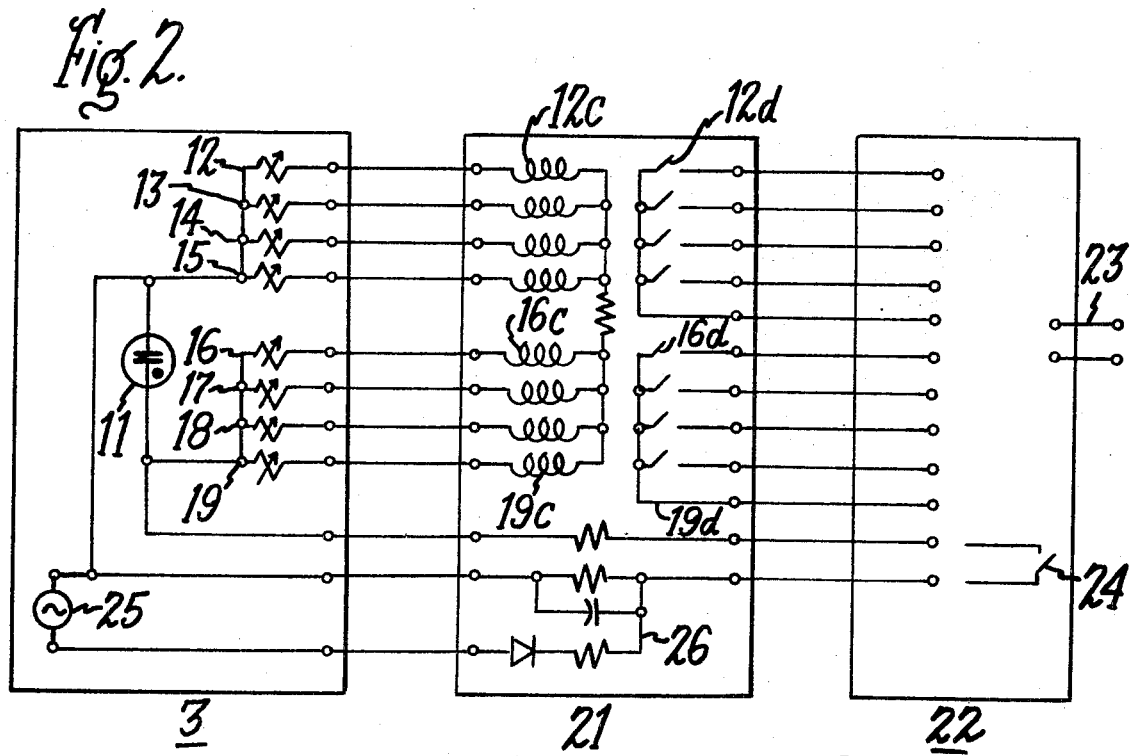

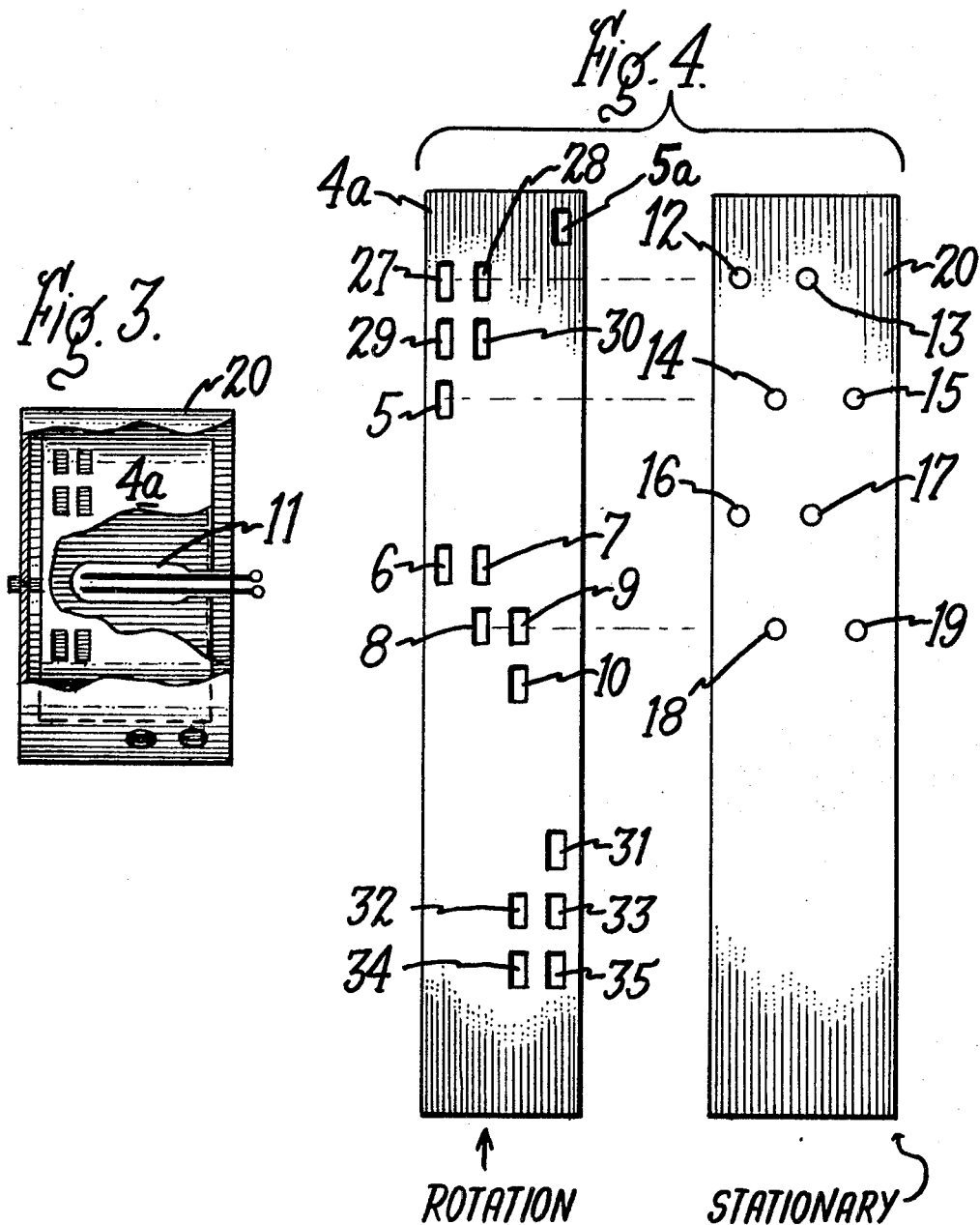

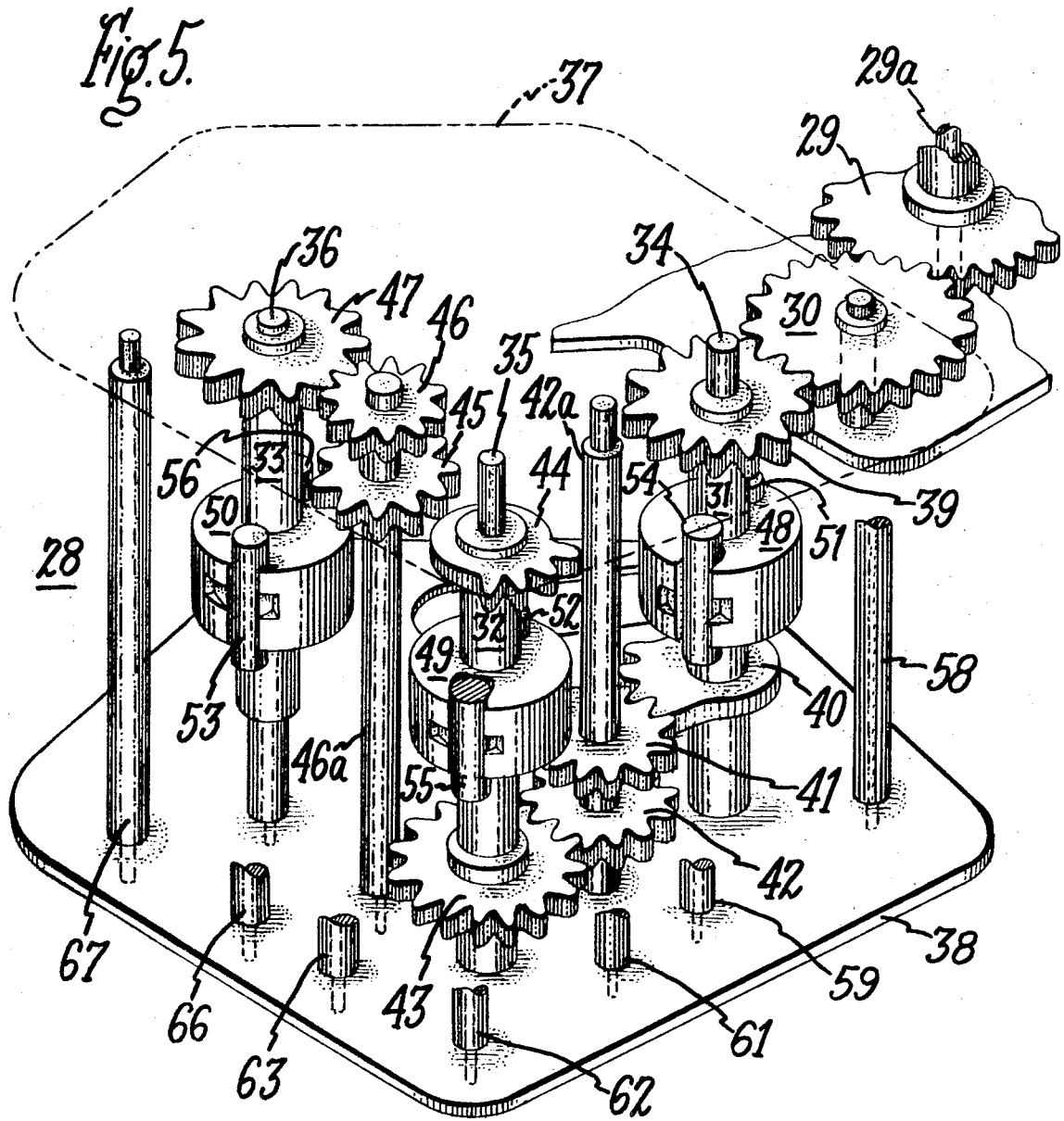

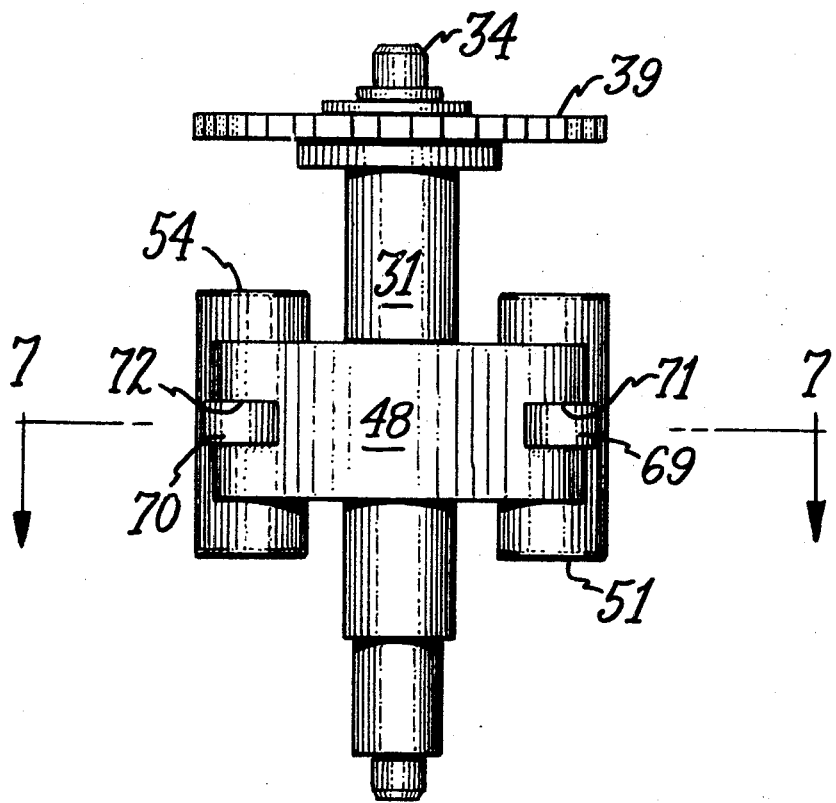

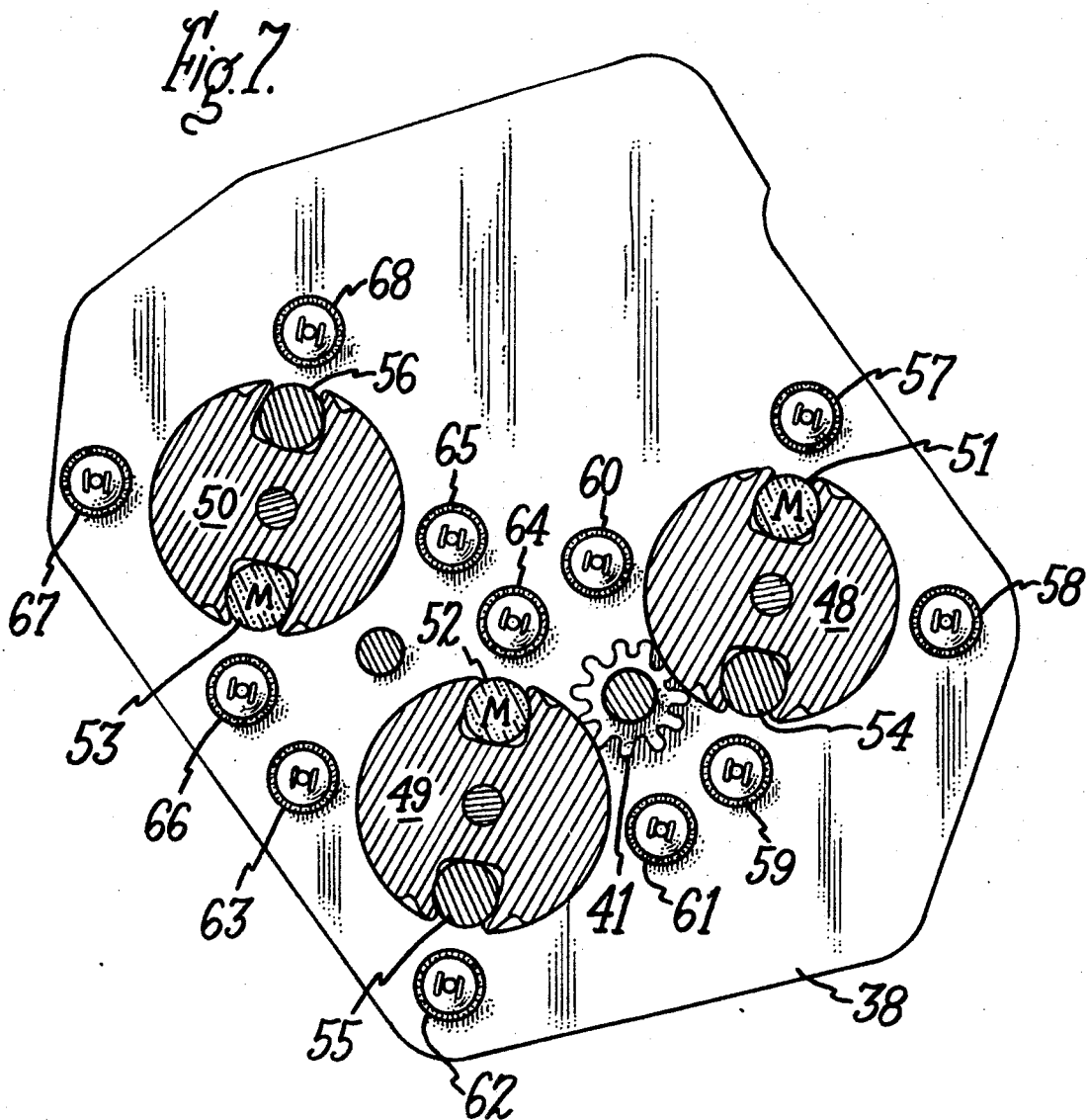

TELEMETERING SYSTEM HAVING A CONTINUOUSLY MONITORING ENCODER

Many different devices and systems have been developed in the prior art for automatically reading meters located at a plurality of relatively remotely spaced points on a utility distribution system without requiring manual access to the individual meters. However, it is still common practice in operating most utility systems, such as those that sell and distribute electric power, water and gas to employ meter readers to visually read meter registers at periodic intervals, rather than utilize such automatic meter reading devices, because of the prohibitive economic limitations heretofore imposed by the acquisition and use of such devices.

Prior art automatic meter reading systems can be generally broken down into two basic types. The first of these types commonly employs a scanner device to sequentially read to four or more decimal digits, the accumulated measure on a meter and transmit this information back to a central point over a suitable communications link. In such systems, the cost of the scanner device is usually prohibitive when compared with the cost of utilizing a manual meter reader to travel to each individual meter and read it separately. The second basic type of automatic meter reading system is somewhat analogous to demand metering and operates by sending individual bits of information to a central recording point each time a monitored meter on the system indicates that a given increment of a metered commodity has been consumed. Such systems are usually economically impractical because they require a communications link between each meter and the central recording point to be maintained continuously available for use although these links are actually used only on relatively infrequent occasions when bits of information are transmitted over them at randomly spaced intervals.

For an automatic meter reading system to be commercially acceptable, it must provide a desired reading function without imposing either of the two foregoing economic penalties on system operating costs. Our invention affords this desirable objective by providing a simplified and inexpensive encoding apparatus to operate in conjunction with an inexpensive signal generating means that makes it possible to periodically read remotely positioned meters over a telecommunications link at any desired time, without requiring that the link be maintained available for such service when a meter reading operation is not being performed. Moreover, our invention eliminates the need for expensive meter scanning apparatus that reads the total information indicated by each of the individual dials of a meter register in the manner suggested by various prior art scanning arrangements.

In one preferred form of our invention, a rotatably actuated encoding apparatus is coupled to one of the rotatable pointer shafts of a multi-dial meter register through a unidirectional escapement mechanism. As the meter dial pointer shaft rotates, it drives an input member of the escapement mechanism to load the mechanism so that it periodically actuates an output member which then drives the encoding mechanism forward with a snap action. Thus, a signal keying portion of the encoding mechanism is advanced sequentially through a series of code positions with successive snap action steps. Each of these positions represents an advancing movement of the monitored meter and thus corresponds to increasingly larger totals of consumption of the commodity being measured by the meter. The individual coded positions are then maintained continuously available to actuate corresponding position-identifying signals for reading over a telecommunications link, so that whenever the telecommunications link is selectively connected and actuated, such signals are immediately transmitted over the link to a central remote recording point. Two unique encoding devices are disclosed herein for use with our novel telemetering system.

An object of our invention is to provide an economically feasible, reliable and accurate telemetering system that obviates the above-mentioned problems of prior art systems.

Another object of our invention is to provide a telemetering system that does not require a continuously dedicated communications link between remotely located meters and a central member-reading location.

A further object of the invention is to provide a telemetering system that affords monitoring of a plurality of meters on the system without requiring the use of expensive scanning apparatus on each meter.

Yet another object of the invention is to provide simplified apparatus for continuously monitoring the registration of an accumulation meter and for encoding the information thus monitored into machine-readable form.

Still another object of the invention is to provide a simplified and reliable photoelectric encoding apparatus combined with an escapement mechanism that is adapted to be coupled to a watthour meter register for encoding information indicated by the register.

Yet another object of the invention is to provide a reliable and inexpensive magnetically actuated electromechanical means for encoding information transmitted to it through a unidirectional escapement mechanism from a meter driven shaft.

Other objects and advantages of the invention will become apparent from the following description taken in connection with the drawings in which:

FIG. 1 is a schematic diagram, partly in block form, showing portions of the disclosed apparatus in exploded view, of a telemetering system constructed pursuant to the present invention.

FIG. 2 is a schematic diagram of the electric circuitry employed in a portion of the telemetering system illustrated in FIG. 1.

FIG. 3 is a side view, partly in cross-section, of a photoelectric encoding device of the type utilized in the system illustrated in FIG. 1.

FIG. 4 is an enlarged, top plan view of two surfaces of the encoding device shown in FIG. 3, illustrating these surfaces in a flattened form rather than in the cylindrical forms that they assume in normal operation.

FIG. 5 is a perspective view, partly in phantom, of a magnetically activated, electromechanical encoding apparatus that is adapted to be substituted in the telemetering system depicted in FIG. 1 for the photoelectric encoder and relays of that system, pursuant to a second embodiment of our invention.

FIG. 6 is a side elevation view of one of the rotatably mounted magnetic holding means utilized in the apparatus depicted in FIG. 5.

FIG. 7 is a top plan view of the apparatus depicted in FIG. 5 taken along a plane parallel to the two end plates shown in FIG. 5 at the position shown by plane 7—7 in FIG. 6.

In FIG. 1 of the drawing, there is shown a schematic view of a telemetering system that extends from a single watthour meter that is being monitored through the sensing and encoding apparatus of our invention to a modulator and telephone line that forms part of a telecommunication link through which the watthour meter can be read from a central point. It will be understood that in a given meter reading system, many such individual meters and corresponding meter reading devices will be required to enable a centrally positioned operator to read each of the remotely located meters without manually inspecting them. Also, it will be appreciated by those skilled in the art, as the description of our invention proceeds, that our invention is suitable for use in reading various types of meters, such as gas or water meters, although we have chosen, for the sake of convenience, to describe the invention as it can be adapted for use in reading watthour meters on an electric power distribution system.

Referring now to FIG. 1 of the drawing, there is shown in block form a watthour meter 1 that is operatively connected to an escapement mechanism 2 (also shown in block form), which in turn is coupled in driving engagement with a unique encoder 3 constructed pursuant to our invention. Encoder 3 comprises an input member 4 in the form of a hollow cylindrical drum having an opaque wall or screen 4a that is provided with a coded pattern of light-transmitting apertures 5-10 therein which allow light transmission from a centrally positioned light source 11, which in this form of the invention is an electric light bulb, to the exterior of opaque screen 4a. The output members of encoder 3 comprise a plurality of photoelectric cells 12-19 that are mounted on a wall of a second hollow cylinder 20 so that their light sensitive elements are exposed to the interior of drum 20. It should be understood that in operating position drum 4 fits inside of drum 20 in the manner shown in FIG. 3 of the drawing, rather than assuming the exploded position depicted in FIG. 1 to facilitate description of the invention.

Each of the photocells 12-19 is electrically connected by suitable electrical conductors 12a-19a, respectively, to individual relays that are designated in FIG. 1 in block form by the identifying number 21. The individual relays 21 are, in turn, directly connected, respectively, through electrical conductors 12b-19b to a modulator 22 (shown in block form) that is adapted to generate predetermined signals for transmission to a telephone line 23, dependent on the particular code signal sent to modulator 22 by encoder 3.

In the preferred form of our invention depicted in FIG. 1, the modulator 22 can be of any suitable commercially available design. For example, we have found that Bell Telephone System's, Utility Meter Reading Data Set X-406A1 (M10), which is described in that company's "Technical Reference" dated October, 1968 and bearing the title Experimental Residential Utility Meter Reading Data Set, is suitable for use in providing the necessary modulating functions for our invention. This Data Set is designed to be connected directly to normal residential telephone lines and does interfere with normal telephone service on such lines. As explained in the foregoing publication, meter reading data may be transmitted over such an interconnected telephone line only when the Data Set is activated by a predetermined alerting signal that is transmitted to it when initiated by a central meter reading location. Accordingly, the meter reading operation may be performed at hours of the day that do not ordinarily involve peak usage of the telephone system, for example, such meter reading operations may be conveniently performed in the early morning hours. Since each meter reading operation with our invention only requires use of the telephone link for a few seconds, there is virtually no chance that its use will interfere with the normal telephone service to the residence.

In order to explain the simplified operation of the invention depicted in FIG. 1, reference is now made to the schematic circuit diagram shown in FIG. 2. The circuit diagram of FIG. 2 omits the watthour meter 1 and escapement mechanism 2 shown in FIG. 1, but the inter-relationship of these components of our invention will be described in further detail below. As seen in FIG. 2, the encoder 3 constitutes a signal generating means comprising the neon lamp 11 which forms the light source for actuating, selectively, two of the eight photocells 12-19. As will be described in detail later, the coded aperture pattern 5-10 in opaque screen 4a allows only one of the first set of four photocells 12-15 to conduct simultaneously with one of the photocells in the second set of photocells 16-19. In the operation of this portion of our invention, an operator located at a central reading point initiates the alert of the modulator 22 which, as part of its operation, closes a switch 24, which connects a suitable source of power 25 through a rectifying circuit 26 to energize lamp 11. Pursuant to our invention, the coded pattern formed by apertures 5-10 in opaque wall 4a is always positioned so that only two of the photocells 12-19 are energized at one time. For example, assume that photocell 12 and photocell 16 are energized by the position of the coded pattern in opaque screen 4a at the time switch 24 is closed. Current then flows through photocells 12 and 16 to energize relays 12c and 16c, which operate to close relay contacts 12d and 16d, respectively. It will be noted that the Data Set has, as an input, only contact closures, that is, it needs no power input from the encoder 3. Closure of switches 12d and 16d serves to energize two different signals in modulator 22 that correspond to, and thus identify, photocells 12 and 16, respectively. These two signals are then transmitted over telephone line 23 by the operation of the Data Set, as described in the above-identified "Technical Reference," to the central meter reading point where they are translated to give an indication to the operator at that point that tells him which relays have been actuated and thus enables calculation of the amount of power consumption which has been metered through meter 1. As the description in the "Technical Reference" explains, the Data Set serves as a modulator which generates tones that are transmitted over telephone lines 23 to another data-set receiver at a central reading station which, in turn, converts the tones back to switch closures that are identical to those presented to the data-set at its meter side. Of course, if photocells 12-19 could offer a proper impedance match, they could feed Data Set modulator 22 directly; however, we have found that the impedance level generated by these photocells is not always sufficient for such direct feeding; accordingly, relays 21 are added to the circuit to act as amplifiers to consistently supply the Data Set modulator 22 with strong, sharp "open" or "closed" contact signals. It will be apparent that as drum 3 rotates through N rest positions (in the illustrated embodiment of the invention N equals 16 rest positions) it is possible for encoder 3 to generate and transmit 16 different signals to modulator 22 due to the various combinations of two simultaneously actuated photocells 12-19. It will also be readily apparent to those skilled in the art that if additional increments or rest positions are desired for a given application it is only necessary to increase the number of actuated photocells and to increase the number of code combinations afforded by the apertures 5-10 in opaque screen 4a. For example, rather than a two-out-of-eight photocell energization arrangement such as that utilized in the illustrated preferred embodiment of our invention, it would be a simple matter to make a three-out-of-twelve encoder by having four additional photocells (not shown) arranged in a proper pattern to be actuated by a coded aperture pattern in opaque screen 4a. However, further description of such alternative embodiments will not be given here, because in the second embodiment of our invention, described below, a three-out-of-twelve encoder is disclosed.

Now that a basic understanding of the encoding mechanism of our invention has been given, a brief description of the application of this invention to a telemetering system for reading electric watthour meters will be described prior to elaborating on the particular encoding arrangement employed in this preferred embodiment. Toward this end, it should be understood that various different types of suitable escapement mechanisms can be used with our invention to afford the function provided by escapement mechanism 2 in the preferred embodiment of the invention. However, we have found that the type of escapement mechanism disclosed and claimed in U.S. Pat. application, Ser. No. 875,245, filed Nov. 10, 1969 of Palmer et al., now U.S. Pat. No. 3,604,274 which is assigned to the assignee of the present invention is particularly adaptable to the unique combination disclosed and claimed as our invention herein. And for the purpose of describing our invention, it will be assumed that escapement mechanism 2 is the type of mechanism described in that patent application. For the purpose of understanding our invention, it is not necessary to describe in detail the structure and function of this escapement mechanism; however, for those desiring further information in this regard, reference is made to the foregoing patent application. It is only necessary to understand that this escapement mechanism is directly coupled by a gear train to a gear mounted on one of the rotatable shafts supporting an indicating pointer on the register of watthour meter 1 so that this input member of escapement mechanism 2 continuously monitors the amount of movement of this rotatable member on meter 1. Escapement mechanism 2 is further operable to advance one of its rotatable output members a predetermined angular degree with a snap-action in response to its input member being driven through a predetermined angular degree. Thus, the rotatable output member of escapement mechanism 2, through its operative coupling to rotatably mounted drum 4, drives drum 4 to rotate unidirectionally in snap-action steps from one rest position sequentially through successive rest positions as watthour meter 1 continues to drive escapement mechanism 2 through succeeding increments. Accordingly, it is apparent that with the above-described arrangement of our invention the total amount of movement of the monitored rotatable pointer-driving member of watthour meter 1, before recycling of the encoding mechanism, can be divided into 16 equal increments.

In order to make the invention practically adapted to read meters on a given electric utility system, it is only necessary to determine a reasonable upper limit of power consumption during a predetermined time interval at the end of which the meter 1 will be read. For example, if it is ascertained that for a particular watthour meter on a given system the measured consumption will assuredly not be more than 160 kilowatt hours during a month, the coupling of escapement mechanism 2 to watthour meter 1 can be adjusted so that each incremental snap action movement of the output member of escapement mechanism 2 corresponds to a movement of the input member of escape mechanism 2 that is equivalent to a 10 kilowatt hour measurement by watthour meter 1. Of course, other meters on the system might be equipped with encoding means coupled at 20 kilowatt hour steps for higher usage. Therefore, when our automatic meter reading system is queried at monthly intervals, the individual watthour meters, such as meter 1, will have driven their respective registers through measuring increments somewhat less than 160 kilowatt hours for the 10 KWH-per-step mechanism, or 320 kilowatt hours for the 20 KWH-per-step mechanism and such sums will be stored in the respective encoding apparatus associated with the individual meters. For example, assume that during the past month watthour meter 1 has measured consumption of 135 kilowatt hours and that the encoder is coupled through a 10 KWH-per-step mechanism. This would mean that escapement mechanism 2 has driven rotatable drum 4 through 13 of its rest positions; accordingly, when the centrally positioned operator causes the closure of switch 24 the light source 11 will actuate two of the photocells 12–19 that key relays 21 and allow modulator 22 to transmit a code signal to telephone line 23 that indicates the positioning of drum 4 at this thirteenth rest position of the possible 16 code positions in a given revolution or cycle of encoder 3. Thus, the operator will be able to ascertain that since the last meter reading at least 130 kilowatt hours have been measured by watthour meter 1. This information and code reading is stored so that the following month's reading can use it as a base line to determine how many additional 10 hour increments are indicated as having measured by watthour meter 1 during the successive month so that a deviation from actual usage during that period of more than 10 kilowatt hours is never accumulated in the system. It will be understood by those skilled in the art that records must be preserved of earlier meter readings so that the increment of change occuring during a period between readings can be computed with the earlier reading to give a measure of the amount of power consumed during that period.

As mentioned above, it will be apparent that if smaller increments of accuracy are desired in reading watthour meter 1, adjustments can be made to more frequently read the meter 1 so that escapement mechanism 1 can be adjusted to make each increment of movement of drum 4 correspond to a smaller number of kilowatt hours of measured power consumption, for example, 5 kilowatt hours per increment rather than 10 be the coding increment, if so desired. It is obvious that such modifications and different modes of operation of our invention are well within its spirit and scope. Rather than examining such alternatives further, a brief description will now be given of the particular code patterns utilized in the preferred embodiment of the invention to energize photocells 12–19, two at a time, as drum 4 is rotated with a snap action through its 16 different rest positions. For this description, reference is made to FIG. 4 of the drawing.

In FIG. 4, the opaque screen 4a of drum 4 is shown in flattened form and the cylindrical surface of drum 20 is also shown in flattened form beside it with both shown in equal size scale for ease of reading, with the coded pattern of apertures 5–10 shown in one of their rest or null positions with respect to photocells 12–19. In the respective positions shown, it will be seen that when light source 11 (see FIGS. 1 and 3) is energized, only coded apertures 27 and 8 are in alignment with any of the photocells; namely, photocells 12 and 18, respectively. The remainder of the apertures in opaque screen 4a are in alignment with the masked portions of cylinder 20 between the respective photocells 12–19 and thus do not energize any of these photocells. Succeeding steps or increments of movement of opaque screen 4a with respect to cylinder 20 cause other pairs of photocells 12–19 to be energized in the sequence indicated by the matching of their respective coded apertures, as designated by their identifying numbers in Table A, below:

Table A

| Step 0 | Aperture | Photo Cells |
|---|---|---|
| 0–16 | 27–8 | 12–18 |
| 1 | 29–6 | 12–16 |
| 2 | 5–9 | 12–17 |
| 3 | 7–10 | 14–17 |
| 4 | 8–31 | 14–19 |
| 5 | 6–33 | 12–19 |
| 6 | 9–35 | 13–19 |
| 7 | 10–32 | 13–17 |
| 8 | 31–34 | 15–17 |
| 9 | 33–5a | 15–19 |
| 10 | 35–28 | 15–18 |
| 11 | 32–30 | 13–18 |
| 12 | 34–27 | 13–16 |
| 13 | 5a–29 | 15–16 |
| 14 | 28–5 | 14–16 |
| 15 | 30–7 | 14–18 |
| 0–16 | 27–8 | 12–18 |

It will be apparent from the foregoing description of our invention that signal generating encoder 3 can be replaced with other signal generating means and we have developed a second unique mechanism for encoding the amount of power consumption measured by watthour meter 1 to place it in suitable form for modulator 22 and transmission over telephone lines 23. To describe this second embodiment of our invention, reference is made to FIG. 5 of the drawing which illustrates an electromechanical encoding mechanism 28 that can be used in a system similar to that shown in FIG. 1 by coupling it into the system in place of encoder 3 and relays 21 between escapement mechanism 2 of that system and modulator 22. Except for the use of four additional relays in the relay bank 21 to afford a three-out-of-twelve coding arrangement, in the manner described below, the remainder of the apparatus shown in FIG. 1 is the same when used with the second embodiment of the invention.

In FIG. 5, gear 29 is the rotatable output member of escapement mechanism 2 (of FIG. 1), and it rotates in a unidirectional fashion around fixed axle 29a with a snap action, as described above. Gear 29 is continuously enmeshed with idler disc gear 30 to impart the same snap action operation to gear 30 and to provide a coupling between escapement mechanism 2 and our electromechanical encoder mechanism 28. Basically, this latter mechanism comprises three rotatably mounted cylindrical shafts 31, 32 and 33 which are, respectively, mounted for rotation about fixed axles 34, 35 and 36 that are journaled in end plates 37 (shown in phantom) and 38. Rotation of shafts 31, 32 and 33 is controlled by a step down gear train comprising disc gear 39 and geneva mechanism 40 journaled on shaft 31, gears 41 and 42 journaled on rotatable shaft 42a, gear 43 and geneva mechanism 44 journaled on shaft 32, gears 45 and 46 journaled on shaft 46a, and finally gear 47 journaled on shaft 33. In this embodiment of our invention, the gear ratios and geneva mechanisms in this gear train are selected so that the ratio of rotation between shaft 31 and 32 is 4 to 1 and the ratio of rotation between shaft 32 and 33 is also 4 to 1; so that when shaft 31 rotates through 360° in four 90° steps, shaft 32 is driven through 90°, only on the last 90° step of shaft 31, and when shaft 32 rotates through 360°, also in four 90° steps, shaft 33 is rotated through 90° on the last 90° step of shaft 32. Since, pursuant to our invention, there are groups of magnetically actuated reed switches positioned around each of the shafts 31, 32 and 33, this gear ratio provides 64 discrete steps or selective reed switch actuating code positions for this "three-out-of-twelve" encoder embodiment of our invention, as will be further described below. The relative positions of shaft 31, 32 and 33 for several 90° steps of shaft 31 is set forth below in Table B:

TABLE B

| Step 0 | Shaft 31 Position | Shaft 32 Position | Shaft 33 Position |
| --- | --- | --- | --- |
| 1 | 1 | 1 | 1 |
| 2 | 2 | 1 | 1 |
| 3 | 3 | 1 | 1 |
| 4 | 4 | 1 | 1 |
| 5 | 1 | 2 | 1 |
| 6 | 2 | 2 | 1 |
| 7 | 3 | 2 | 1 |
| 8 | 4 | 2 | 1 |
| 9 | 1 | 3 | 1 |
| 10 | 2 | 3 | 1 |
| 11 | 3 | 3 | 1 |
| 12 | 4 | 3 | 1 |
| 13 | 1 | 4 | 1 |
| 14 | 2 | 4 | 1 |
| 15 | 3 | 4 | 1 |
| 16 | 4 | 4 | 1 |
| 17 | 1 | 1 | 2 |
| 18 | 2 | 1 | 2 |
| etc. up to: | | | |
| 62 | 2 | 4 | 4 |
| 63 | 3 | 4 | 4 |
| 64 | 4 | 4 | 4 |
| 1 | 1 | 1 | 1 |
| 2 | 2 | 1 | 1 |

Mounted on shafts 31, 32 and 33, respectively, for rotation therewith are non-magnetic discs 48, 49 and 50. Securely clamped in position on these discs are permanent magnets 51, 52 and 53, respectively. Opposite each of these magnets on the respective discs 48–50 are metal counterweights 54, 55 and 56 that counterbalance the weight of magnets 51–53 to prevent unequal torques on the gear train of mechanism 28 when it is repeatedly advanced with snap action motions in response to the driving force of disc gear 29 of escapement mechanism 2.

In this embodiment of our invention, in lieu of the photocells 12–19 discussed above, to control the energization of relay 21, 12 reed switches 57–68 (also see FIG. 7) are arranged in three groups of four switches each around the rotatably mounted magnets 51, 52 and 53. It will be understood that these 12 reed switches 57–68 control the modulator 22 of FIG. 2 in the same manner, and to afford the same function, as the eight relays 12c–19c shown in FIG. 2 of the drawing. Thus, for each of the 64 rest positions afforded by a single complete cycle of encoding mechanism 28, three of the reed switches 57–68 will be energized to afford 64 different codes in the manner described above with reference to the 16 different codes afforded by the embodiment of our invention described with reference to FIGS. 1 and 2 of the drawing. For example, in the operating position shown in FIG. 7 of the drawing, magnet 51 will close reed switch 57, magnet 52 will close reed switch 64 and magnet 53 will close reed switch 66. Then, when escapement mechanism 2, through gears 29 and 30, drives disc gear 39 with a snap action through its next 90° step, magnet 51 rotates to a point adjacent reed switch 58 to close that switch. (Of course, switch 57 then changes to its normally open state due to a pre-set bias in the switch.) If geneva mechanism 40 is not in position to have moved shaft 32 on this 90° step of shaft 31, then magnets 52 and 53 will hold reed switches 64 and 66, respectively, closed as switch 57 opens and switch 58 closes. This second of 64 possible positions is distinctive to modulator 22 as the only position where switches 58, 64 and 66 are closed and all others are open. It will be apparent that as gear 29 is rotated with a snap action by escapement mechanism 2 to additional rest positions successive different signals will be actuated by the different positions assumed by magnets 51–53 with relation to the twelve reed switches 57–68; therefore, it is not believed that further enumeration of these successive steps is necessary to an understanding of our invention and such discussion is not given herein. Moreover, it will be apparent to those skilled in the art that variations may be made in this modification of our invention without departing from its true scope and spirit. For example, with the particular modulator mentioned above, it is possible and desirable to eliminate one switch from each of two magnet assemblies without reducing the number of output signals of mechanism 28 from the desired 64 distinctive signals. Specifically, we have found that in the arrangement depicted in FIG. 7 it is desirable to eliminate reed switches 57 and 64 while still maintaining the capability of mechanism 28 to generate 64 different codes by selectively controlling modulator 22. Obviously, other modifications of this portion of our invention can be made by those skilled in the art without departing from the scope of the invention.

It should be understood that electromechanical escapement mechanism 28 is used with the same type of telephone data set described above with reference to the photocell embodiment of our invention described with particular reference to FIGS. 1 and 2; therefore, it is felt that further detailed description of the mode of operation of this embodiment of our invention is unnecessary to facilitate a complete understanding of it. However, in order to explain the detailed structure of the mounting arrangement for magnets 51–53 and their corresponding counterweights 54–56, reference is made to FIG. 6 of the drawing which illustrates one of the rotatably mounted cylindrical shafts 31 and its associated hardware. It will be understood that each of the magnet mounting means of mechanism 28 is identical; therefore, a description of one of them is applicable to all of these mounting means. As seen in FIG. 6, shaft 31 is rotatably mounted around an axle 34 and disc gear 39 is journaled to shaft 31 for rotation therewith. Also mounted in fixed relation on shaft 31 is non-magnetic disc 48 having two pair of jaws 69 and 70 positioned at diametrically opposite points. Jaw 69 engages cylindrically shaped magnet 51 to securely hold it in position with relation to disc 48 and, in similar manner, jaw 70 holds cylindrically shaped non-magnetic counterweight 54 in position relative to disc 48.

Additional modifications and variations of our invention will be apparent to those skilled in the art and all such embodiments of the invention are intended to be encompassed within the true spirit and scope of the following claims.

What we claim as new and desire to secure by Letters patent of the United States is:

1. A telemetering system comprising, in combination, a meter having a measuring mechanism including a rotatable member that is rotated at a rate which is a function of the quantity of a commodity measured by the meter, sensing means operatively connected to said rotatable member for continuously sensing the amount of rotation of said rotatable member, signal means responsively coupled to the output of said sensing means for producing a different output signal for each of a number of different amounts of rotation of said rotatable member, said signal means being responsively coupled to the output of the sensing means by a transducer that operates without any direct mechanical friction producing engagement between said signal means and said sensing means, means for transmitting each of said signals to a location remote from said meter, means at said remote location for translating each of said signals into readable form thereby to afford a readable indication at said remote location of the quantity of commodity measured by said meter, and means for operatively connecting said means for transmitting the signals to receive each of said signals whereby a quantity measured by said meter is indicated at said remote point when said means for connecting is actuated to its operative condition.

2. A telemetering system as in claim 1 wherein said sensing means comprises an escapement mechanism permanently coupled in driving relationship with said rotatable member so that an input member of said escapement mechanism is driven in response to movement of said rotatable member, said escapement mechanism having an output member that is moved a predetermined angular distance with a snap action in response to said input member being driven a predetermined angular distance.

3. A telemetering system as in claim 2 wherein said signal means is operable to produce N different signals in response respectively to one of N different codes being generated by said transducer and transmitted to the signal means, said signal means comprising a plurality of photocells mounted in a predetermined pattern adjacent said transducer; and wherein said transducer includes a photoelectric encoding mechanism for generating each of said N different codes, said encoding mechanism comprising; a light source, an opaque screen having a coded pattern of light-transmitting apertures therein, and means for coupling said screen in driven relationship to the output member of said escapement mechanism thereby to effect relative movement between said screen and the photocells of said signal means in direct response to movement of the output member of said escapement mechanism, whereby said coded pattern is moved relative to said photocells with a snap action between N rest positions, to cause different given sets of photocells to be actuated at each different rest position responsive to light passing from the light source through given apertures in said screen that are placed in alignment, respectively, with said given different sets of photocells at said respective rest positions.

4. A telemetering system as in claim 3 wherein said coded pattern is of predetermined length and operative to enable only a given number of different photocells to be energized by the light source at each of said rest positions whereby N different combinations of photocells are sequentially energizable by successive relative movement of said screen and photocells through all of said rest positions, each of said output signals of the signal generating means being actuated respectively by energization of the photocells in a different one of said N different combinations.

5. A telemetering system as in claim 2 wherein said signal means is operable to produce N different signals in response respectively to one of N different codes being generated by said transducer and transmitted to the signal means, said signal means comprising a plurality of magnetically actuable reed switches mounted adjacent said transducer; and wherein said transducer includes an electro-mechanical encoding mechanism for generating each of said N different codes, said encoding mechanism comprising at least one magnetic member, means for effecting relative movement between said magnetic member and said switches of said signal means in direct response to movement of the output member of said escapement mechanism whereby said magnetic member is moved relative to said reed switches with a snap action between N rest positions to cause different given sets of reed switches to be actuated at each different rest position responsive to said magnetic member being selectively moved close enough to said sets of reed switches to actuate them as it is moved to said respective rest positions.

6. A telemetering system as in claim 5 wherein said means for effecting relative movement comprises a gear train coupled in driving relationship to said magnetic device and driven by the output member of said escapement mechanism, and said magnetic device comprises a plurality of magnets each of which are rotatably mounted respectively on a separated disc of non-magnetic material, said plurality of switches being divided into groups each of which contain an equal number of said switches or switch positions, each of said groups of switches or switch positions being positioned respectively around one of said magnet supporting discs so that they are successively energized when the discs are rotated to move the magnets adjacent said switches or switch positions.

7. Apparatus for use in a telemetering system to continuously encode into machine readable form variations in a measure of a quantity of a commodity measured by a meter in the system, comprising, in combination, a meter having a rotatable member that is rotated as a function of the quantity of a commodity measured by the meter, a sensing means operatively connected to said rotatable member for continuously sensing the amount of rotation of said rotatable member, signal generating means responsively coupled to the output of said sensing means for generating a different output signal for each of a number of different amounts of rotation of said rotatable member, said signal means being responsively coupled to the output of the sensing means by a transducer that operates without any direct mechanical friction producing engagement between said signal means and said sensing means, and means for transmitting each of said signals to a location spaced apart from said meter.

8. The invention defined in claim 7 wherein said sensing means comprises a mechanical escapement mechanism having a rotatably mounted input gear and a snap action output gear that rotates with a snap action through a predetermined number of rest positions located about its 360° of rotation, said input gear being continuously coupled in driven relationship with said rotatable member of said meter, and wherein said signal generating means comprises a plurality of magnetically actuable reed switches adjacent said transducer, and wherein said transducer includes an electro-mechanical encoder operatively connected to selectively energize one to N combinations of said switches in response to movement of the output gear of said escapement mechanism to each of said predetermined number of said rest positions, and a source of variable frequency signals connected to said switches and selectively energized thereby to produce a different signal for each of said predetermined number of rest positions of said output gear.

9. The invention defined in claim 8 wherein said electro-mechanical encoder comprises a plurality of magnets each rotatably mounted on separate non-magnetic holders, and wherein said plurality of magnetically actuable reed switches are mounted in operative position around each of said magnets for sequential energization thereby when said magnets are moved adjacent said switches, and including a reduction gear train for rotating said insulating holders in a predetermined manner thereby to selectively actuate predetermined combinations of said reed switches, said gear train being continuously coupled in driving relationship to the output gear of said escapement mechanism.

* * * * *

UNITED STATES PATENT OFFICE
CERTIFICATE OF CORRECTION

Patent No. 3,662,368          Dated May 9, 1972

Inventor(s) Richard G. Farnsworth and James H. Keller, Jr.

It is certified that error appears in the above-identified patent and that said Letters Patent are hereby corrected as shown below:

Col. 2, line 4, "member-" should be -- meter- --

Col. 3, line 34, after "does" and before "interfere" insert -- not --

Col. 5, line 55, after "having" and before "measured" insert -- been --

, lin3 71, after "10" and before "be", insert -- may --

Col. 6, Table A, Change "Step 0" to -- Step No. --

Col. 7, Table B, Change "Step 0" to -- Step No. --

Signed and sealed this 2nd day of January 1973.

(SEAL)
Attest:

EDWARD M. FLETCHER, JR.
Attesting Officer

ROBERT GOTTSCHALK
Commissioner of Patents